US012771453B2

(12) United States Patent
Nakano

(10) Patent No.: US 12,771,453 B2
(45) Date of Patent: Oct. 20, 2026

(54) OPTICAL TRANSCEIVER, OPTICAL COMMUNICATION SYSTEM, AND METHOD FOR INPUTTING LIGHT TO OPTICAL TRANSCEIVER

(71) Applicant: NEC Corporation, Tokyo (JP)

(72) Inventor: Masayuki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 340 days.

(21) Appl. No.: 18/227,765

(22) Filed: Jul. 28, 2023

(65) Prior Publication Data

US 2024/0048241 A1 Feb. 8, 2024

(30) Foreign Application Priority Data

Aug. 4, 2022 (JP) ................................ 2022-125124

(51) Int. Cl.
*H04B 10/40* (2013.01)
*G02B 6/42* (2006.01)

(52) U.S. Cl.
CPC ........... *H04B 10/40* (2013.01); *G02B 6/4246* (2013.01)

(58) Field of Classification Search
CPC .............................. H04B 10/40; G02B 6/4246
See application file for complete search history.

(56) References Cited

U.S. PATENT DOCUMENTS

2003/0039010 A1 2/2003 Akimoto et al.
2014/0064721 A1 3/2014 Wang
2018/0109348 A1 4/2018 Salsi
2018/0123720 A1* 5/2018 Nomura .................. G02B 6/42
2021/0058152 A1* 2/2021 Yutani .................. G02B 6/4261
2021/0075188 A1* 3/2021 Tomita ..................... G02B 6/42
2023/0034045 A1* 2/2023 Chen .................... G02B 6/3831
2023/0275672 A1* 8/2023 Seo ...................... H04B 10/572
398/95
2024/0178921 A1* 5/2024 Koma ............... H04B 10/0775

FOREIGN PATENT DOCUMENTS

JP 2003-134058 A 5/2003
JP 2003-283435 A 10/2003
JP 2009-213039 A 9/2009
JP 2013090184 A * 5/2013
JP 2014-514878 A 6/2014
JP 2020-194958 A 12/2020
WO 2020/105143 A1 5/2020

OTHER PUBLICATIONS

Japanese Office Action for JP Application No. 2022-125124, mailed on Apr. 28, 2026 with English Translation.

* cited by examiner

*Primary Examiner* — Pranesh K Barua
(74) *Attorney, Agent, or Firm* — Sughrue Mion, PLLC

(57) ABSTRACT

An object is to provide an optical transceiver, an optical communication system, and a method for inputting a light to an optical transceiver capable of efficiently reducing power consumption. A first input/output port is connected to a communication destination apparatus. A second input/output port is connected to a light source. An optical signal transmission unit receives a light input from the second input/output port and output an optical signal obtained by modulating the received light through the first input/output port. An optical signal reception unit receives an optical signal input to the first input/output port from the communication destination apparatus.

9 Claims, 8 Drawing Sheets

OPTICAL TRANSCEIVER, OPTICAL COMMUNICATION SYSTEM, AND METHOD FOR INPUTTING LIGHT TO OPTICAL TRANSCEIVER

INCORPORATION BY REFERENCE

This application is based upon and claims the benefit of priority from Japanese patent application No. 2022-125124, filed on Aug. 4, 2022, the disclosure of which is incorporated herein in its entirety by reference.

TECHNICAL FIELD

The present disclosure relates to an optical transceiver, an optical communication system, and a method for inputting a light to an optical transceiver.

BACKGROUND ART

Due to prominent increase in communication traffic, expansion of transmission capacity has been required. According to this, speed-up and increase in capacity of an optical network are progressing. An optical transceiver (International Patent Publication No. WO 2020/105143, Japanese Unexamined Patent Application Publications Nos. 2020-194958 and 2003-283435) that is a key device of an optical network system is required to achieve speed-up, reduction of power consumption, and an optical pass-through function.

For example, in Innovative Optical and Wireless Network (IWON) framework, a Small Form-Factor Pluggable (SFP) optical transceiver is adopted, and it is required for a small optical transceiver such as a SFP optical transceiver to satisfy the demand described above.

SUMMARY

While there is an upper limit of power consumption of the SFP optical transceiver, functions to be implemented in the SFP optical transceiver are increasing. Thus, the SFP optical transceiver may not have enough power when trying to implement the functions to the SFP optical transceiver. Accordingly, in the SFP optical transceiver, it is difficult to concurrently achieve reduction of power consumption, measure for speed-up such as increase in transmission rate and multi-level modulation, and a function for flexibly setting a wavelength.

Therefore, to provide a further function to the SFP optical transceiver, it is required to establish a technology for efficiently reducing power consumption.

The present disclosure has been made in view of the above circumstances, an object thereof is to provide an optical transceiver, an optical communication system, and a method for inputting a light to an optical transceiver capable of efficiently reducing power consumption.

An aspect of the present disclosure is an optical transceiver including: a first input/output port connected to a communication destination apparatus; a second input/output port connected to a light source provided outside; an optical signal transmission unit configured to output a first optical signal through the first input/output port, the first optical signal being obtained by modulating a light input from the light source through the second input/output port; and an optical signal reception unit configured to receive a second optical signal input to the first input/output port from the communication destination apparatus.

An aspect of the present disclosure is an optical communication system including: an optical transceiver; and a light source configured to output a light to the optical transceiver, in which the optical transceiver comprises: a first input/output port connected to a communication destination apparatus; a second input/output port connected to the light source provided outside; an optical signal transmission unit configured to output a first optical signal through the first input/output port, the first optical signal being obtained by modulating the light input from the light source through the second input/output port; and an optical signal reception unit configured to receive a second optical signal input to the first input/output port from the communication destination apparatus.

An aspect of the present disclosure is a method for inputting a light to an optical transceiver, in an optical transceiver comprising: a first input/output port connected to a communication destination apparatus; a second input/output port connected to a light source provided outside; an optical signal transmission unit configured to output a first optical signal through the first input/output port, the first optical signal being obtained by modulating a received light; and an optical signal reception unit configured to receive a second optical signal input to the first input/output port from the communication destination apparatus, comprising inputting a light to the optical signal transmission unit from the light source through the second input/output port.

According to the present disclosure, it is possible to provide an optical transceiver, an optical communication system, and a method for inputting a light to an optical transceiver capable of efficiently reducing power consumption.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Figure 1:
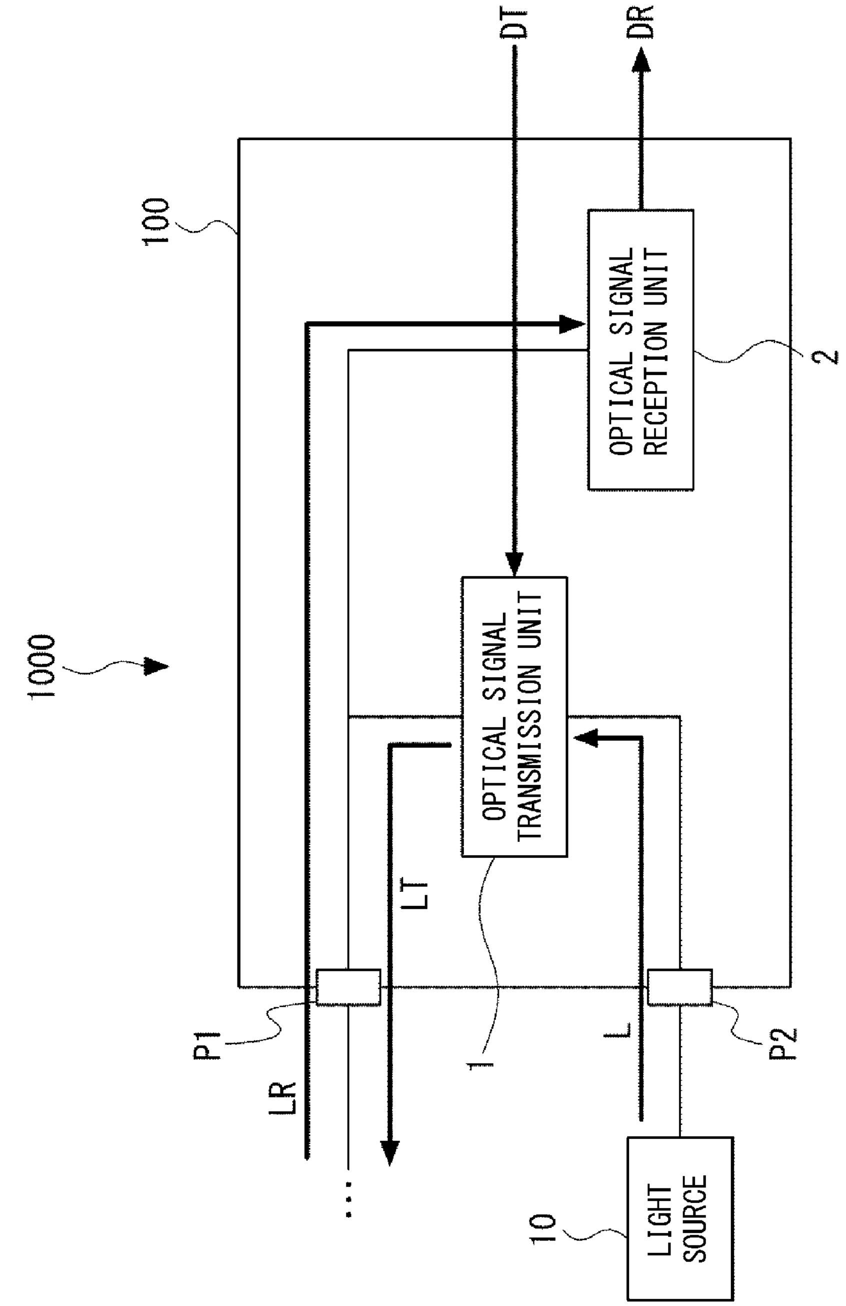
FIG. 1 schematically shows a configuration of an optical transceiver according to a first example embodiment.

Hereinafter, example embodiments of the present invention will be described with reference to the drawings. In the drawings, the same elements are denoted by the same reference signs, and redundant description will be omitted as necessary.

First Example Embodiment

An optical transceiver according to a first example embodiment will be described. FIG. 1 schematically shows a configuration of an optical transceiver 100 according to the first example embodiment. The optical transceiver 100 includes an optical signal transmission unit 1, an optical signal reception unit 2, a first input/output port P1, and a second input/output port P2. In the present configuration, the optical transceiver 100 bi-directionally communicates with a communication destination apparatus that is a communication partner through the first input/output port P1. A light L introduced into the optical transceiver 100 from a light source 10 arranged outside the optical transceiver 100 through the second input/output port P2.

The first input/output port P1 is connected to the communication destination apparatus that performs bi-directional communication with the optical transceiver 100 through an optical transmission path such as an optical fiber. Needless to say, in the connection, various devices and equipment that mediate communication may be interposed between the optical transceiver 100 and the communication destination apparatus.

The second input/output port P2 is connected to the light source 10 arranged outside the optical transceiver 100 through an optical transmission path such as an optical fiber.

The first input/output port P1 corresponds to one of a transmission port and reception port in a Small Form-Factor Pluggable (SFP) optical transceiver, and the second input/output port P2 corresponds to the other of the transmission port and reception port in the SFP optical transceiver.

The optical signal transmission unit 1 receives the light L output from the light source 10 arranged outside the optical transceiver 100 through the second input/output port P2. The optical signal transmission unit 1 outputs an optical signal LT obtained by modulating the light L in response to a transmission data signal DT input from the outside, which is an electric signal, to the external communication destination apparatus through the first input/output port P1. Note that the optical signal LT is also referred to as a first optical signal.

Here, the external light source 10 is configured as a wavelength-tunable laser module. The light source 10 is not limited to this, and may appropriately configured as a light source of various configurations.

An optical signal LR input from the communication destination apparatus through the first input/output port P1 is input to the optical signal reception unit 2. The optical signal reception unit 2 converts the received optical signal LR into a reception data signal DR that is an electric signal and outputs the reception data signal DR to the outside, for example, to an optical transmission apparatus 1100 described later. Note that the optical signal LR is also referred to as a second optical signal.

Figure 2:
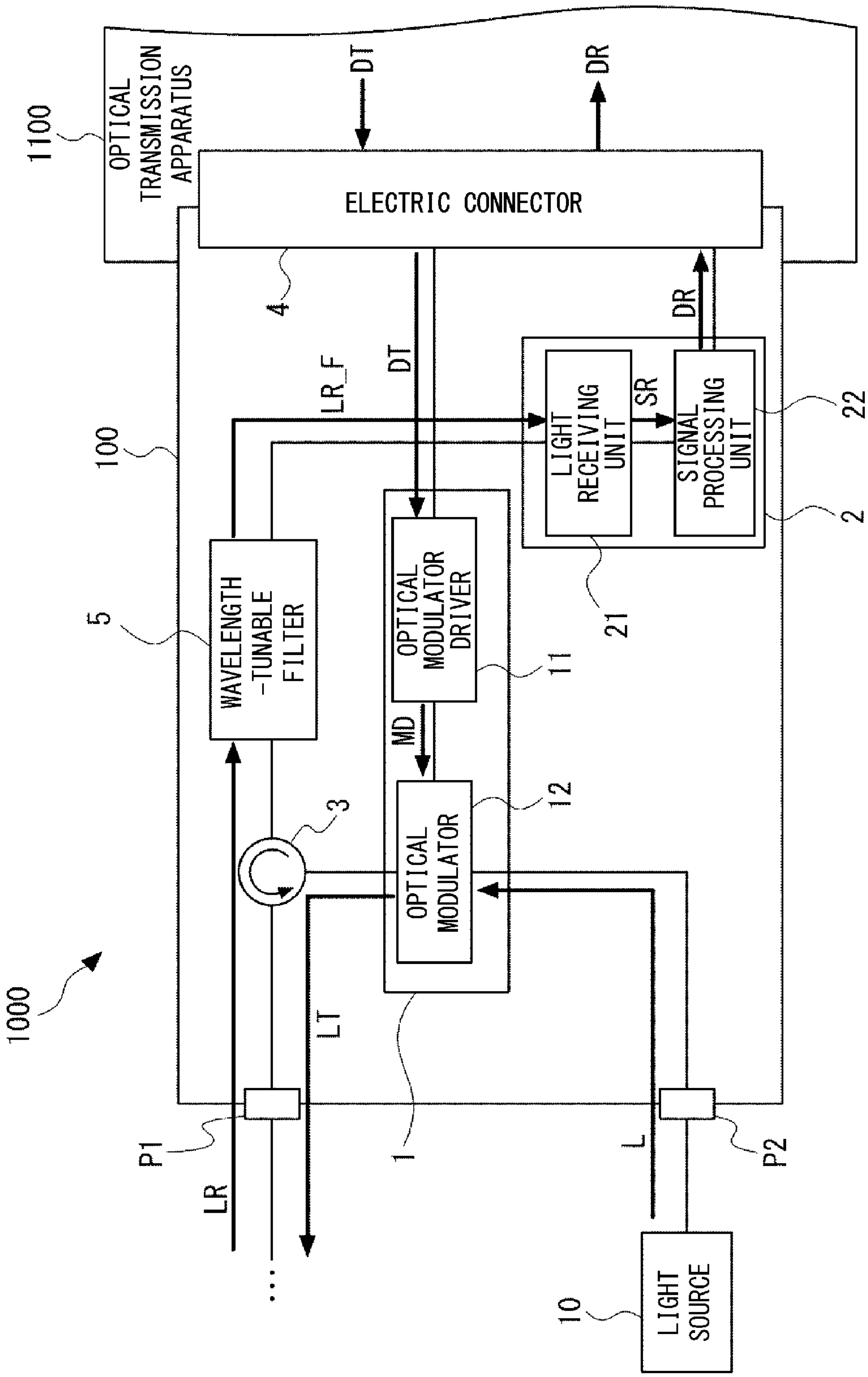
FIG. 2 schematically shows a configuration of an optical communication system according to the first example embodiment.

The optical transceiver 100 and peripheral devices thereof will be described in detail. FIG. 2 schematically shows a configuration of an optical communication system 1000 according to the first example embodiment. The optical transceiver 100 shown in FIG. 2 further includes an optical circulator 3, an electric connector 4, and a wavelength-tunable filter 5. Note that the optical circulator 3 is also referred to as a second optical circulator.

The wavelength-tunable filter 5 is inserted between the first input/output port P1 and the optical signal reception unit 2. The optical circulator 3 is inserted between the first input/output port P1, the optical signal transmission unit 1, and the wavelength-tunable filter 5.

When the optical transceiver 100 is configured as a wavelength-tunable optical transceiver, it is conceivable that a wavelength of the optical signal LR received through the first input/output port P1 is changed depending on the purpose. As in the present configuration, by inserting the wavelength-tunable filter 5 in the former stage of the optical signal reception unit 2, an optical signal LR_F having the wavelength to be received, which has been transmitted by the wavelength-tunable filter 5, can be selectively input to the optical signal reception unit 2.

The optical signal transmission unit 1 includes an optical modulator driver 11 and an optical modulator 12. The optical modulator driver 11 receives a transmission data signal DT through the electric connector 4 and output a modulation signal MD based on the transmission data signal DT to the optical modulator 12. The optical modulator 12 outputs the optical signal LT obtained by modulating the light L in response to the modulation signal MD to the optical circulator 3. The optical signal LT is output by the optical circulator 3 to the external communication destination apparatus through the first input/output port P1.

The optical signal reception unit 2 includes a light receiving unit 21 and a signal processing unit 22. The optical signal LR is input from the communication destination apparatus to the optical circulator 3 through the first input/output port P1. The optical signal LR is output by the optical circulator 3 to the wavelength-tunable filter 5. The wavelength-tunable filter 5 wavelength-filters the optical signal LR and outputs the optical signal LR_F having the wavelength that the wavelength-tunable filter 5 transmits to the light receiving unit 21. The light receiving unit 21 receives the optical signal LR_F and outputs a signal SR that is an electric signal obtained by photoelectrically converting the optical signal LR_F to the signal processing unit 22. The signal processing unit 22 outputs the reception data signal DR obtained by performing predetermined signal processing on the signal SR output from the light receiving unit 21 to the outside through the electric connector 4.

The electric connector 4 of the optical transceiver 100 is inserted into the optical transmission apparatus 1100. As described above, for simplification of the drawings, the example in which one optical transceiver 100 is attached to the optical transmission apparatus 1100 has been described. However, a plurality of optical transceivers 100 may be attached to the optical transmission apparatus 1100, and one or more optical transceivers 100 and one or more other optical transceivers may be attached to the optical transmission apparatus 1100.

The light source 10 may be housed in a light source unit arranged separately from the optical transmission apparatus in a terminal station in which the optical transmission apparatus 1100 is installed. Further, the light source 10 may be arranged in the optical transmission apparatus 1100.

As described above, according to the present configuration, since the light source 10 can be arranged outside the optical transceiver 100, the power consumption of the optical transceiver 100 can be reduced by the power consumption of the light source 10. As a result, a configuration achieving various functions such as speed-up can be installed in the optical transceiver 100.

Further, by arranging the light source 10 outside the optical transceiver 100, constraints on the light source 10 can be relaxed. For example, since there is an upper limit of the power consumption of the optical transceiver 100, there is an upper limit of the power consumption of the light source 10. However, according to the present configuration, it is possible to select a light source to be used regardless of the upper limit of the power consumption of the optical transceiver 100. Further, since the light source 10 does not need to be housed in a limited size housing of the optical transceiver 100, a demand for miniaturization of the light source 10 can be relaxed. As a result, a range of usable light sources can be expanded.

Second Example Embodiment

An optical communication system according to a second example embodiment will be described. The optical communication system according to the present example embodiment is configured in such a manner that the wavelength of the light L output from the light source 10 can be changed or specified in response to a wavelength request signal included in the optical signal LR received from the external communication destination apparatus.

Figure 3:
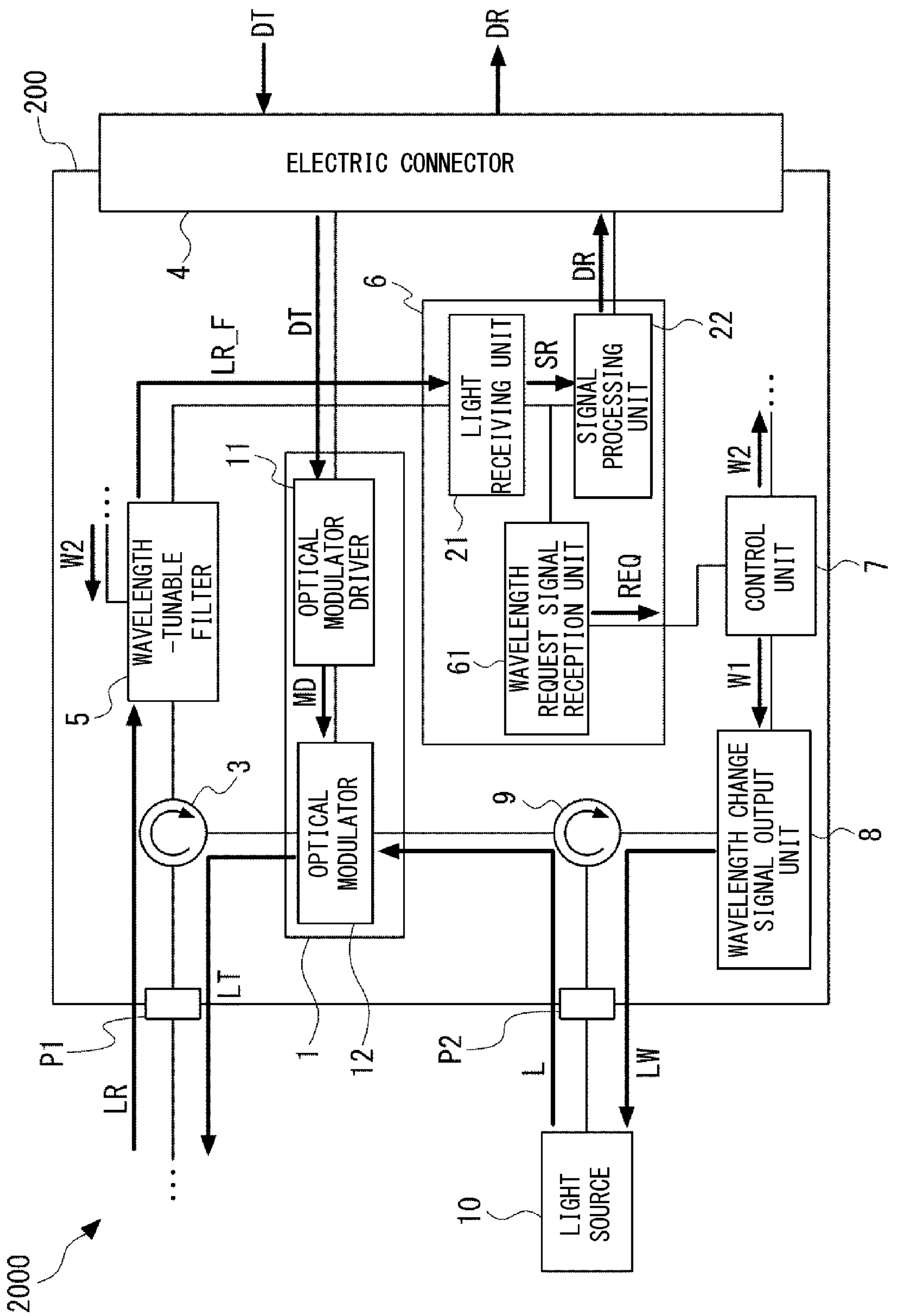
FIG. 3 schematically shows a configuration of an optical communication system according to a second example embodiment.

FIG. 3 schematically shows a configuration of an optical communication system 2000 according to the second example embodiment. The optical communication system 2000 has a configuration in which the optical transceiver 100 of the optical communication system 1000 is replaced with an optical transceiver 200.

The optical transceiver 200 has a configuration in which the optical signal reception unit 2 is replaced with an optical signal reception unit 6, and a control unit 7, a wavelength change signal output unit 8, and an optical circulator 9 are added. The optical signal reception unit 6 has a configuration in which a wavelength request signal reception unit 61 is added to the optical signal reception unit 2. Note that the optical circulator 9 is referred to as a first optical circulator. Further, in the present configuration, the light source 10 may be configured as a wavelength-tunable light source element such as a wavelength-tunable leaser module.

Figure 4:
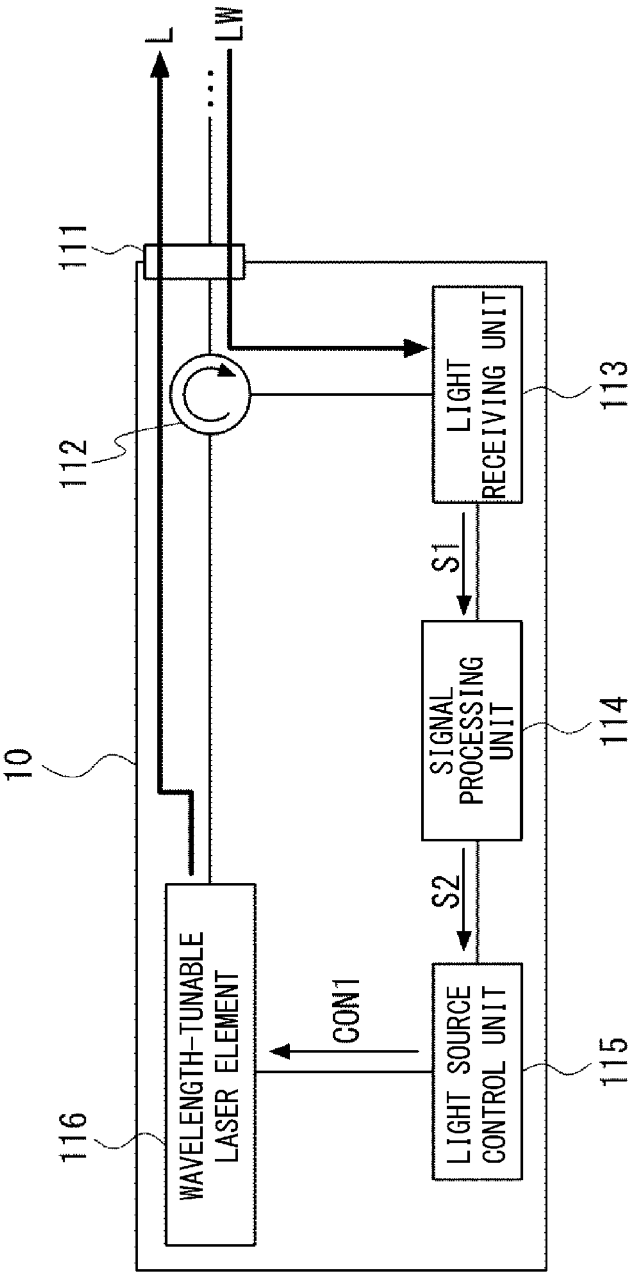
FIG. 4 schematically shows a configuration of a light source according to the second example embodiment.

A configuration of the light source 10 according to the present example embodiment will be described. FIG. 4 schematically shows the configuration of the light source 10 according to the second example embodiment. Here, the light source 10 is configured as a wavelength-tunable light source that can switch the wavelength of the light L to be output. The light source 10 includes an input/output port 111, a circulator 112, a light receiving unit 113, a signal processing unit 114, a light source control unit 115, and a wavelength-tunable laser element 116.

The wavelength-tunable laser element 116 outputs the light L to the optical transceiver 200 through the input/output port 111. After that, the light L is input to the optical circulator 9 through the second input/output port P2. A wavelength change optical signal LW output from the wavelength change signal output unit 8 is input to the input/output port 111 through the second input/output port P2, and then input to the light receiving unit 113.

The light receiving unit 113 receives the wavelength change optical signal LW, and outputs a signal S1 that is an electric signal obtained by photoelectrically converting the wavelength change optical signal LW to the signal processing unit 114. The signal processing unit 114 outputs a signal S2 obtained by performing predetermined signal processing on the signal S1 output from the light receiving unit 113 to the light source control unit 115. The light source control unit 115 outputs a control signal CON1 to the wavelength-tunable laser element 116 in response to the signal S2 to instruct the wavelength-tunable laser element 116 to switch the wavelength of the light L.

Figure 5:
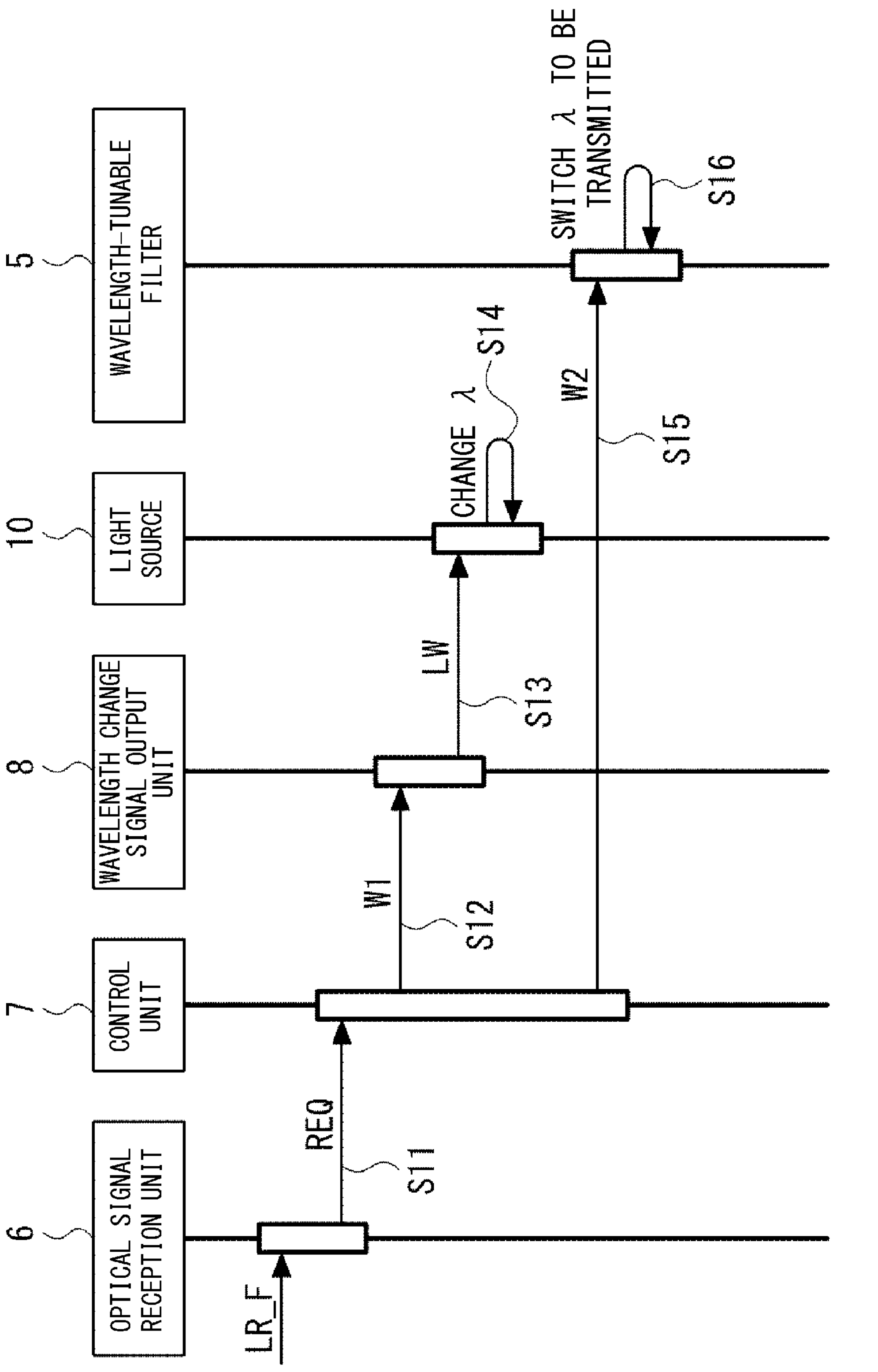
FIG. 5 shows a sequence of a wavelength change operation of the optical communication system according to the second example embodiment.

Next, a wavelength change operation of the optical communication system 2000 according to the second example embodiment will be described. FIG. 5 shows a sequence of the wavelength change operation of the optical communication system 2000 according to the second example embodiment.

Step S11

The light receiving unit 21 receives the optical signal LR_F, and output the signal SR obtained by photoelectrically converting the optical signal LR_F to the signal processing unit 22 and the wavelength request signal reception unit 61. In the present example embodiment, the optical signal LR_F received by the light receiving unit 21 includes a signal instructing to switch the wavelength of the light L output from the light source 10, in other word, a wavelength request signal specifying the wavelength of the light L. For example, the wavelength request signal may be superimposed on the optical signal LR_F by Amplitude Shift Keying (ASK) modulation. The wavelength request signal reception unit 61 extracts the wavelength request signal included in the signal SR output from the light receiving unit 21 and outputs a wavelength request signal REQ indicating the extraction result to the control unit 7.

Step S12

Base on the wavelength request signal REQ, the control unit 7 outputs a wavelength change signal W1 instructing to switch the wavelength of the light L to be output from the light source 10 to the wavelength change signal output unit 8.

Step S13

Based on the wavelength change signal W1, the wavelength change signal output unit 8 outputs the wavelength change optical signal LW to the optical circulator 9. Note that the wavelength change optical signal LW is also referred to as a third optical signal. The wavelength change optical signal LW output from the wavelength change signal output unit 8 is input to the optical circulator 9 and output by the optical circulator 9 to the light source 10 through the second input/output port P2.

In the present configuration, the light L output from the light source 10 is input to the optical circulator 9 through the first input/output port P1 and output by the optical circulator 9 to the optical signal transmission unit 1.

Step S14

The light source 10 receives the wavelength change optical signal LW and changes the wavelength of the light L to be output into a wavelength indicated by the wavelength change optical signal LW. Specifically, as described above, the light receiving unit 113 photoelectrically converts the wavelength change optical signal LW into the signal S1, and the signal processing unit 114 outputs the signal S2 obtained by performing the predetermined signal processing on the signal S1 to the light source control unit 115. The light source control unit 115 outputs the control signal CON1 to the wavelength-tunable laser element 116 in response to the signal S2 to instruct the wavelength-tunable laser element 116 to switch the wavelength of the light L. The wavelength-tunable laser element 116 changes the wavelength of the light L to be output in response to the control signal CON1.

Step S15

Base on the wavelength request signal REQ, the control unit 7 outputs a wavelength change signal W2 to the wavelength-tunable filter 5 on order to instruct to change the wavelength of the optical signal LR_F to be transmitted.

Step S16

The wavelength-tunable filter 5 changes the wavelength of the light to be transmitted into a wavelength indicated by the wavelength change signal W2. Thus, the light receiving unit 21 can receive the optical signal LR_F having the wavelength specified by the wavelength request signal REQ.

Hence, according the present configuration, it is further possible to change the wavelength of the light L output from the light source arranged outside in response to the wavelength request signal input from the outside. Furthermore, it is also possible to appropriately correspond to the wavelength of the optical signal to be received by changing the transmission wavelength of the wavelength-tunable filter in response to the wavelength request signal.

Third Example Embodiment

An optical communication system according to a third example embodiment will be described. The optical communication system according to the present example embodiment is a modified example of the optical communication system according to the second example embodiment, and configured to be able to select a wavelength-tunable laser element outputting the light L to the optical transceiver in response to the wavelength request signal.

Figure 6:
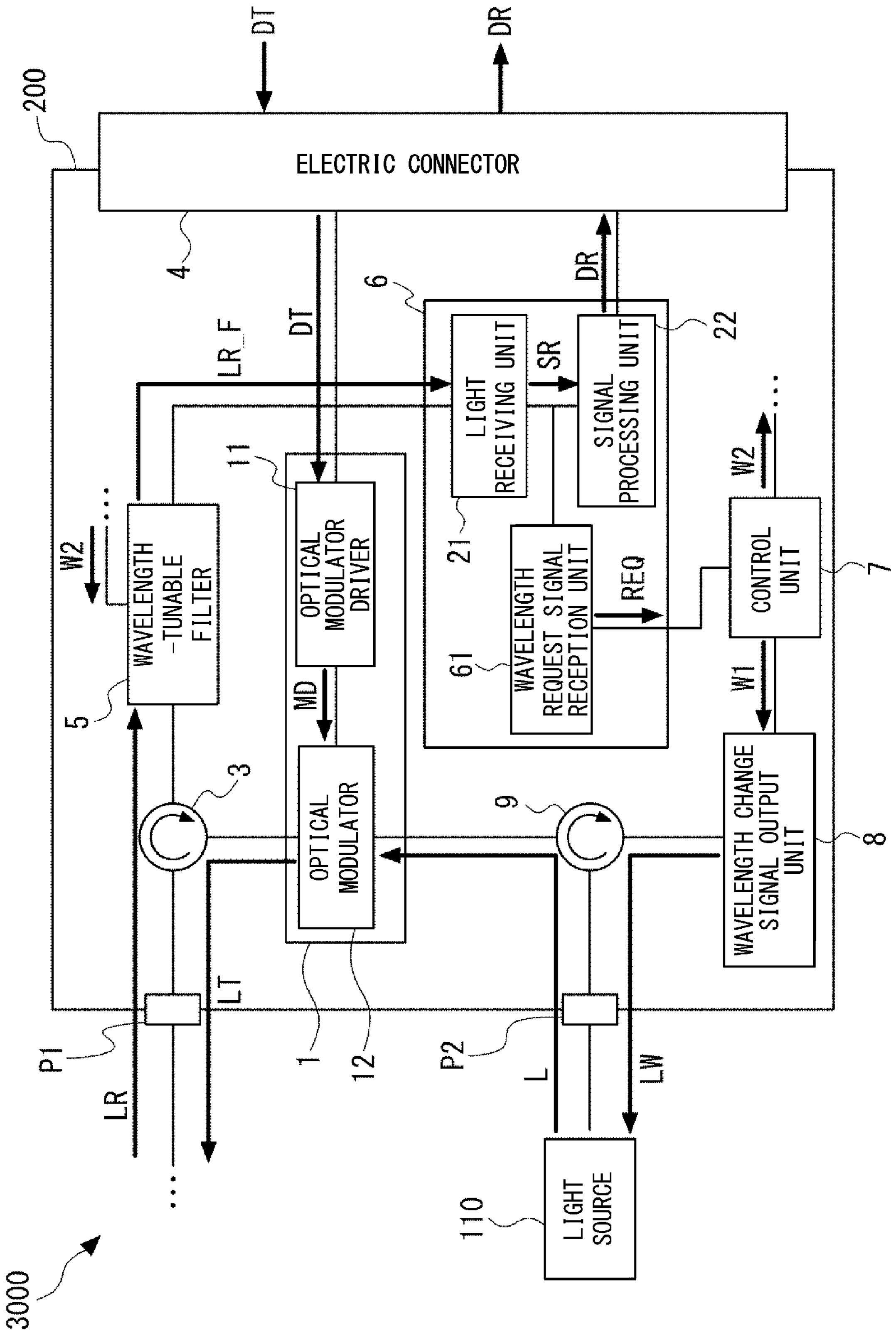
FIG. 6 schematically shows an optical communication system according to a third example embodiment.

FIG. 6 schematically shows an optical communication system 3000 according to the third example embodiment. Since the optical transceiver 200 is the same as that according to the second example embodiment, a description thereof will be omitted. In the optical communication system 3000, a light source 110 is provided instead of the light source 10 of the optical communication system 2000.

Figure 7:
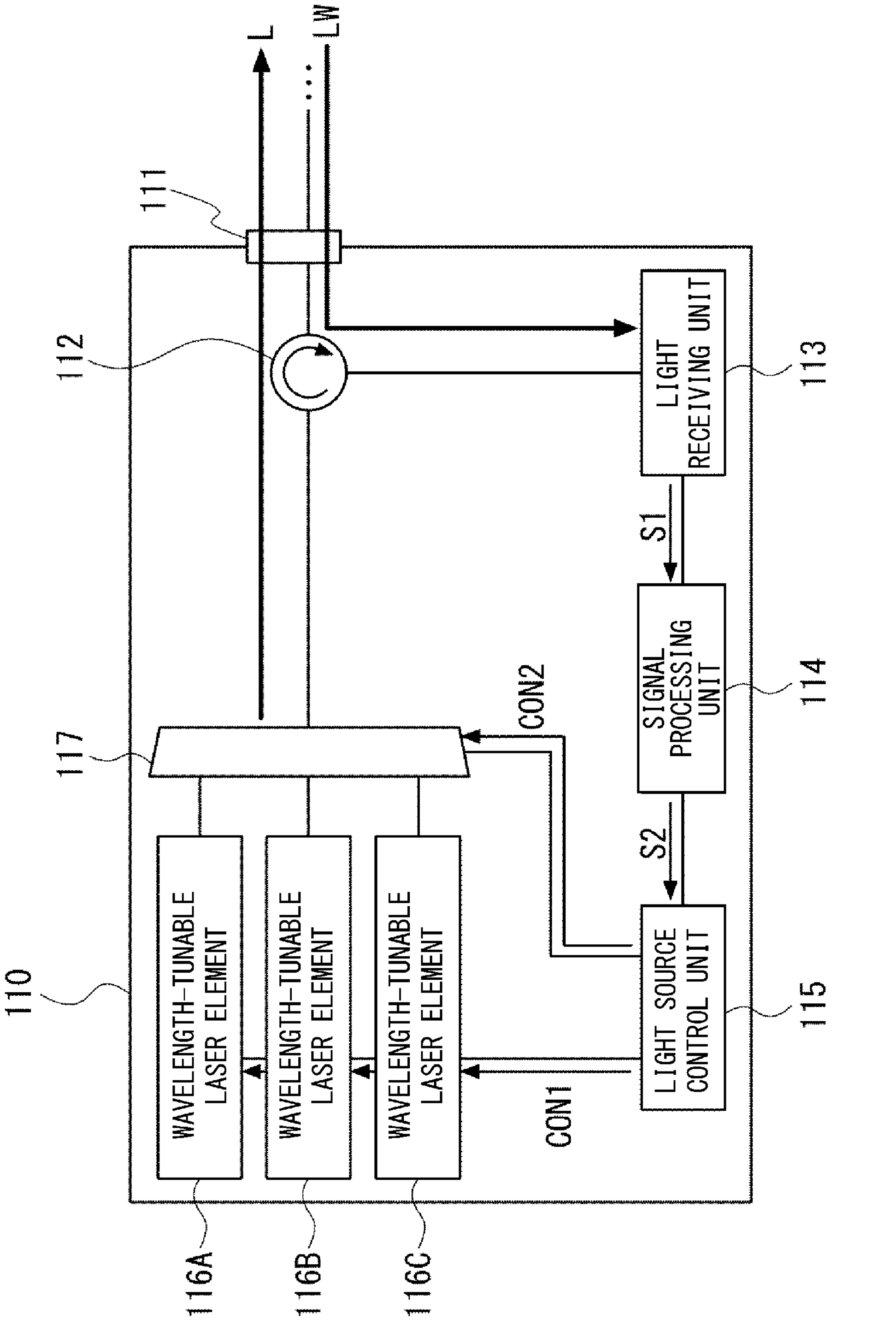
FIG. 7 schematically shows a configuration of a light source according to the third example embodiment.

A configuration of the light source 110 will be described. The light source 110 is configured to include a plurality of wavelength-tunable laser elements. FIG. 7 schematically shows the configuration of the light source 110 according to the third example embodiment. Compared to the light source 10, in the light source 110, three wavelength-tunable laser elements 116A to 116C are provided instead of the wavelength-tunable laser element 116. Here, the wavelength-tunable laser elements 116A to 116C output lights of different wavelengths, respectively.

Compared to the light source 10, a switching circuit 117 is added to the light source 110. The switching circuit 117 is inserted between the wavelength-tunable laser elements 116A to 116C and the circulator 112, and configured to switch an optical transmission path between the wavelength-tunable laser elements 116A to 116C and the circulator 112.

Figure 8:
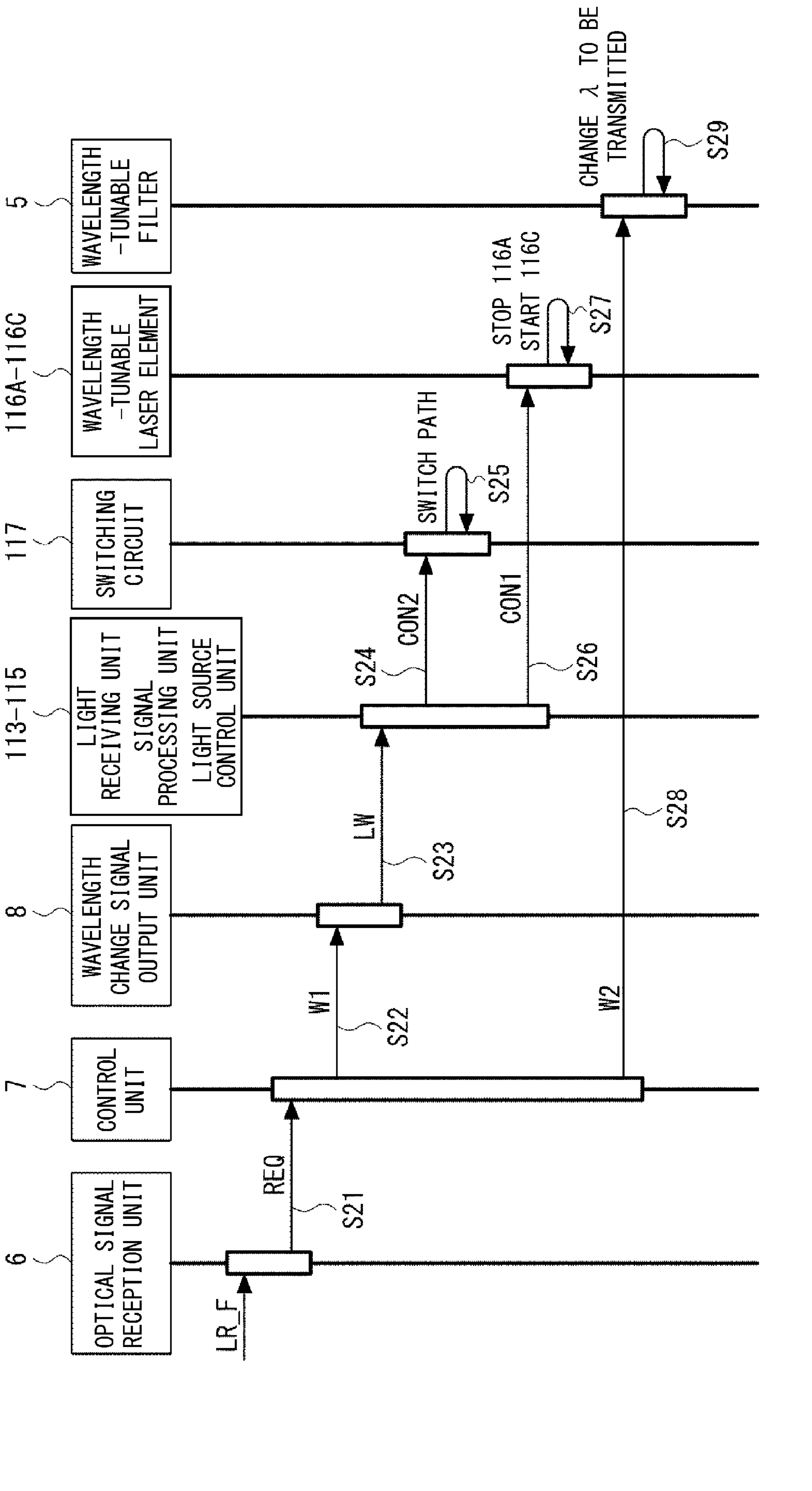
FIG. 8 shows a sequence of a wavelength change operation of the optical communication system according to the third example embodiment.

Next, a wavelength change operation of the optical communication system 3000 will be described. FIG. 8 shows a sequence of the wavelength change operation of the optical communication system 3000 according to the third example embodiment.

Steps S21 to S23

Since steps S21 to S23 are respectively the same as the steps S11 to S13 in FIG. 5, descriptions thereof will be omitted.

Step S24

The light source control unit 115 receives the signal S2 obtained by converting the wavelength change optical signal LW and performing the predetermined signal processing on the converted signal from the signal processing unit 114. Then, the light source control unit 115 outputs a control signal CON2 to the switching circuit 117 to change an optical transmission path in the switching circuit 117 in response to the signal S2 to cause the light L output from one of the wavelength-tunable laser elements 116A to 116C to reach the input/output port 111.

Step S25

The switching circuit 117 changes the optical path therein in response to the received control signal CON2.

Step S26

The light source control unit 115 controls the wavelength-tunable laser elements 116A to 116C by the control signal CON1 in such a manner that only a wavelength-tunable laser element that can output the light having the wavelength specified by the wavelength change optical signal LW outputs the light. Here, a case in which the light source outputting the light L is changed from the wavelength-tunable laser element 116A into the wavelength-tunable laser element 116C will be described.

Step S27 In response to the control signal CON1, the wavelength-tunable laser element 116A stops outputting the light, and the wavelength-tunable laser element 116C starts outputting the light.

Steps S28 and S29

Since steps S28 and S29 are respectively the same as the steps S15 and S16 in FIG. 5, descriptions thereof will be omitted.

Hence, according to the present configuration, it is further possible to output a light from a light source element outputting a light having an appropriate wavelength in response to a wavelength request signal even if a plurality of light source elements are provided outside.

Other Example Embodiments

Note that the present invention is not limited to the above-described example embodiments, and can be appropriately changed without departing from the gist. For example, although it has been described that the wavelength request signal is received from the external communication destination apparatus, it is merely an exemplification. For example, an optical signal including the wavelength request signal may be input from an apparatus other than the communication destination apparatus such as any control apparatus, which is connected to the first input/output port P1 to be able to output an optical signal thereto, to the optical transceivers according to the above-described example embodiments.

Although it has been described that the light source outputting the light is changed from the wavelength-tunable laser element 116A to the wavelength-tunable laser element 116C in the optical communication system according to the third example embodiment, it is merely an exemplification. That is, the light source outputting the light may be changed from the wavelength-tunable laser element 116A to the wavelength-tunable laser element 116B. The light source outputting the light may be changed from the wavelength-tunable laser element 116B to the wavelength-tunable laser element 116A. The light source outputting the light may be changed from the wavelength-tunable laser element 116B to the wavelength-tunable laser element 116C. Further, the light source outputting the light may be changed from the wavelength-tunable laser element 116C to the wavelength-tunable laser element 116A. The light source outputting the light may be changed from the wavelength-tunable laser element 116C to the wavelength-tunable laser element 116B. A light source element provided in the light source 110 may be not only a wavelength-tunable laser element but also light emitting elements of various types.

Although it has been described that the three light source elements are provide in the optical communication system according to the third example embodiment, it is merely an exemplification. The number of the light source elements may be two or greater than three.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An optical transceiver comprising:
a first input/output port connected to a communication destination apparatus;
a second input/output port connected to a light source provided outside;
an optical signal transmission unit configured to output a first optical signal through the first input/output port, the first optical signal being obtained by modulating a light input from the light source through the second input/output port; and
an optical signal reception unit configured to receive a second optical signal input to the first input/output port from the communication destination apparatus,
wherein the second optical signal includes a signal specifying a wavelength of the light output from the light source, and
the optical transceiver outputs a third optical signal to the light source through the second input/output port, the third optical signal being different from the second optical signal and causing the light source to change the wavelength of the light to the specified wavelength.

2. The optical transceiver according to claim 1, wherein the optical signal reception unit comprises:
a light receiving unit configured to receive the second optical signal and output a signal indicating a reception result;
a wavelength request signal reception unit configured to receive the signal specifying the wavelength of the light included in the signal indicating the reception result and output a wavelength request signal that is the received signal;
a control unit configured to output a signal instructing to change the wavelength of the light in response to the wavelength request signal; and
a wavelength change signal output unit configured to convert the signal instructing to change the wavelength of the light into the third optical signal and output the converted signal to the light source through the second input/output port.

3. The optical transceiver according to claim 2, wherein the light source comprises:
a wavelength-tunable light source element; and
a light source control unit, wherein
the light source control unit outputs a control signal to the wavelength-tunable light source element in response to the third optical signal to change the wavelength of the light output from the wavelength-tunable light source element.

4. The optical transceiver according to claim 2, wherein the light source comprises:
a plurality of wavelength-tunable light source elements; and
a light source control unit, wherein
the light source control unit outputs a control signal to the plurality of wavelength-tunable light source elements in response to the third optical signal and controls the plurality of wavelength-tunable light source elements to cause only one wavelength-tunable light source element corresponding to a wavelength specified by the third optical signal to output the light.

5. The optical transceiver according to claim 2, further comprising a first optical circulator configured to output the light input from the light source through the second input/output port to the optical signal transmission unit and output the third optical signal input from the wavelength change signal output unit to the second input/output port.

6. The optical transceiver according to claim 2, further comprising:
a wavelength-tunable filter inserted between the first input/output port and the optical signal reception unit and configured to wavelength-filter the second optical signal; and
a second optical circulator configured to output the first optical signal input from the optical signal transmission unit to the first input/output port and output the second optical signal input from the communication destination apparatus through the first input/output port to the wavelength-tunable filter, wherein
the control unit outputs a signal specifying a wavelength that the wavelength-tunable filter transmits in response to the wavelength request signal, and
the wavelength-tunable filter changes a transmission wavelength in response to the signal specifying the wavelength that the wavelength-tunable filter transmits.

7. The optical transceiver according to claim 1, wherein the optical transceiver is configured as a SFP optical transceiver.

8. An optical communication system comprising:
an optical transceiver; and
a light source configured to output a light to the optical transceiver, wherein
the optical transceiver comprises:
a first input/output port connected to a communication destination apparatus;
a second input/output port connected to the light source provided outside;
an optical signal transmission unit configured to output a first optical signal through the first input/output port, the first optical signal being obtained by modulating the light input from the light source through the second input/output port; and
an optical signal reception unit configured to receive a second optical signal input to the first input/output port from the communication destination apparatus;
wherein the second optical signal includes a signal specifying a wavelength of the light output from the light source, and
the optical transceiver outputs a third optical signal to the light source through the second input/output port, the third optical signal being different from the second optical signal and causing the light source to change the wavelength of the light to the specified wavelength.

9. A method for inputting a light to an optical transceiver, in an optical transceiver comprising: a first input/output port connected to a communication destination apparatus; a second input/output port connected to a light source provided outside; an optical signal transmission unit configured to output a first optical signal through the first input/output port, the first optical signal being obtained by modulating a light output from the light source; and an optical signal reception unit configured to receive a second optical signal input to the first input/output port from the communication destination apparatus, wherein the second optical signal includes a signal specifying a wavelength of the light output from the light source, the method comprising:

outputting a third optical signal to the light source from the optical transceiver through the second input/output port, the third optical signal being different from the second optical signal and causing the light source to change the wavelength of the light to the specified wavelength, and inputting the light to the optical signal transmission unit from the light source through the second input/output port.

* * * * *